Patented June 3, 1952

2,599,501

UNITED STATES PATENT OFFICE 2,599,501

REACTION OF PHOSPHORUS HALIDES WITH MONOOLEFIN-CARBON MONOXIDE COPOLYMERS

Robert W. Upson, Wilmington, Del., assignor to E. I. du Pont de Nemours & Company, Wilmington, Del., a corporation of Delaware No Drawing. Application March 23, 1949, Serial No. 83,107

9 Claims. (Cl. 260—63)

This invention relates to polymeric materials, and more particularly to phosphorous-containing polymers.

This invention has as an object a new type of phosphorous-containing polymer. A further object is the production of polymers of this kind which are alpha - hydroxy - alkanephosphonic acids and esters of these acids. Further objects reside in methods for obtaining these polymers.

The polymeric alpha - hydroxyalkanephosphonic acids with which the present invention is concerned are prepared by reacting polyketones, i. e., polymers containing a plurality of recurring units in which a carbonyl group is present, and in which the carbonyl carbons are units of the polymer chain with phosphorus trichloride and glacial acetic acid or acetic anhydride followed by acidic hydrolysis. These polymers contain 3 or more chain carbons in the repeating unit, the maximum number depending upon the molar ratio of combined monoolefin units to carbonyl groups. The esters of these polymeric alpha-hydroxyalkanephosphonic acids may be prepared from the acids themselves or more readily by reacting the polyketones directly with the diester of a halophosphoric acid, e. g., diethyl chlorophosphate.

The polyketones which are used in the present invention and from which the polymeric alpha-hydroxyalkanephosphonic acids and their esters are most advantageously obtained, are the polyketones resulting from the copolymerization of monoolefins and carbon monoxide.

In one method for preparing the polymeric alpha-hydroxyalkanephosphonic acids of this invention, the polymeric ketone is dissolved in glacial acetic acid and a reactive proportion of phosphorous trichloride is added. After reaction is complete the reaction mixture is acid hydrolyzed and the product isolated.

The following examples are further illustrative of the practice of this invention. All quantities are given in parts by weight unless otherwise designated.

Example I

A mixture of 35.45 parts of a polyketone containing ethylene and carbon monoxide in a mole ratio of 5.33:1 and of molecular weight 1465, and 34.7 parts of phosphorus trichloride is prepared and allowed to stand at room temperature for two hours. It is then added at room temperature, with stirring, to 36 parts of glacial acetic acid. The viscous solution resulting is stirred at room temperature for three hours and then heated on a steam bath under a pressure of 20 millimeters of mercury until all volatile material is removed. A gelatinous residue is obtained to which is added 200 parts of 6N aqueous hydrochloric acid solution. The resulting mixture is heated on a steam bath for one hour and the volatile materials again removed by distillation under a pressure of 20 millimeters of mercury. The residue remaining is extracted with 316 parts of hot acetone then with 316 parts of hot methanol and finally with 350 parts of hot benzene. There is thus obtained 30 parts of a polymeric alpha-hydroxyalkanephosphonic acid from the parent ethylene/carbon monoxide polyketone as a brown, granular product. This polymeric alpha-hydroxyphosphonic acid is insoluble in acetone, benzene, methanol—hot as well as cold, softens at 145° C. and contains 8.1% phosphorus which corresponds to a conversion of approximately 59% of the carbonyl groups in the parent polyketone to alpha-hydroxyalkanephosphonic acid groups. The polymer is pressed at 145° C. into a smooth film which exhibits considerable strength coupled with brittleness and which does not support combustion.

From the combined acetone/benzene extracts, there is obtained upon removal of the volatile solvent a soft, tacky, solid which contains 10.4% phosphorous by analysis. These results indicate this polymer to be another polymeric alpha-hydroxyalkanephosphonic acid from the 5.33:1 ethylene/carbon monoxide polyketone. The amount of phosphorus found corresponds to a conversion of approximately 82% of the carbonyl groups in the parent polyketone to alpha-hydroxyalkanephosphonic acid groups.

Example II

To a solution of 58 parts of a polyketone containing combined ethylene and carbon monoxide in the molar ratio 1.9:1 and of molecular weight 2050 in 210 parts of glacial acetic acid is added 88 parts of phosphorus trichloride at room temperature over a period of 1.2 hours. The reaction mixture is stirred at room temperature for two hours and 200 parts of aqueous 6N hydrochloric acid added. Upon addition of the hydrochloric acid solution, hydrogen chloride gas is evolved and a brown, solid product precipitates. The product is collected on a filter, washed thoroughly with water and dried. There is thus obtained 55 parts of a polymeric alpha-hydroxyalkanephosphonic acid from the parent 1.9:1 ethylene/carbon monoxide polyketone, as a brown, granular solid, insoluble in common organic solvents and non-softening at temperatures as high as 300° C. Analyses indicate that this polymer contains 5.9% phosphorus which corresponds to a conversion of approximately 18% of the carbonyl groups in the parent polyketone to alpha-hydroxyalkanephosphonic acid groups.

*Example III*

A solution of 17.2 parts of phosphorus trichloride in 26.2 parts of glacial acetic acid is added over a period of three hours to a solution of 25 parts of a polyketone, containing combined propylene and carbon monoxide in a molar ratio of 3.3:1 and exhibiting a molecular weight of 438, dissolved in 52.5 parts of glacial acetic acid. The reaction mixture is stirred at room temperature for two hours and then heated on a steam bath for an additional two hours during which time hydrogen chloride gas is evolved. One hundred (100) parts of aqueous 6N hydrochloric acid solution is then added and heating continued for one hour. The volatile materials are then removed from the reaction mixture by distillation on a steam bath under a pressure of 16 millimeters of mercury and the residue washed thoroughly with water and dried. There is obtained a polymeric alpha-hydroxyalkanephosphonic acid from the parent 3.3:1 propylene/carbon monoxide polyketone as a black, viscous liquid. Analyses indicate this product to contain 2.7% phosphorus which corresponds to a conversion of approximately 15.6% of the carbonyl groups in the parent polyketone to alpha-hydroxyalkanephosphonic acid groups.

*Example IV*

A solution of 17.2 parts of phosphorus trichloride in 26.2 parts of glacial acetic acid is added over a period of three hours to a solution of 27 parts of an ethylene/2-methylpropene-1/carbon monoxide polyketone, of molecular weight 929 and containing 30.2% combined carbon monoxide, dissolved in 52.5 parts of glacial acetic acid. The reaction is carried out and the product isolated as described in Example III. There is obtained a polymeric alpha-hydroxyalkanephosphonic acid of the parent ethylene/2-methylpropene-1/carbon monoxide polyketone as a dark, soft solid. It is slightly soluble in chloroform and acetic acid and does not soften at temperatures as high as 300° C. Analyses indicate this polymeric product to contain 5.5% phosphorus which corresponds to a conversion of approximately 19% of the carbonyl groups in the parent polyketone to alpha-hydroxyalkanephosphonic acid groups.

*Example V*

A solution containing fifty (50) parts of diethylchlorophosphate, 52.5 parts of glacial acetic acid and 10 parts of a solid polyketone containing combined ethylene and carbon monoxide in a molar ratio of 1.4:1 is stirred at room temperature for one hour. The reaction is then carried out and the product isolated as described in Example III. There is thus obtained 10 parts of a polymeric diethyl alpha-hydroxyalkanephosphonate of the parent ethylene/carbon monoxide polyketone as a dark solid. The product is slightly soluble in benzene and does not soften at temperatures up to 300° C. Analyses indicate that this product contains 2.0% phosphorus which corresponds to a conversion of approximately 4.8% of the carbonyl groups in the parent polyketone to diethyl alphahydroxyalkanephosphonate groups.

The monoolefin/carbon monoxide polymers used in the practice of this invention can be obtained by reacting the monoolefin with carbon monoxide in contact with a peroxy catalyst and in the absence of a Friedel-Crafts catalyst at temperatures of from 25° C. to 350° C. under any pressure above atmospheric. Particularly favorable reaction conditions include temperatures of about 50° to 150° C. and pressures of 20 to 1500 atmospheres. Methods for the preparation of these polymers are more particularly described in application Serial No. 552,374, filed September 1, 1944 by M. M. Brubaker, and in application Serial No. 28,365 filed May 21, 1948 by P. S. Pinkney, both being now abandoned. The ethylene/carbon monoxide polymers mentioned in the examples can be replaced by any of the polyketones obtained by reacting carbon monoxide with an olefin of 2 to 4 carbon atoms, e. g., ethylene, propylene, 1-butene, 2-butene, 2-methylpropene-1 or with a mixture of these olefins. The monoolefin/carbon monoxide polymer used in Example I was prepared by the following procedure:

In a silver-lined, high-pressure reactor is placed 100 cc. of cyclohexane and 3 cc. of di-tert.-butylperoxide. The reactor is closed, cooled, evacuated and finally pressured to 2,000 lbs./sq. in. with a gaseous mixture of 88% ethylene and 12% carbon monoxide by weight. The contents are then heated at 135° C. with agitation for 15 hours while maintaining the internal pressure within the reactor as close to 2,000 lbs./sq. in. as possible by intermittent repressuring with the ethylene/carbon monoxide gas mixture. At the end of this time, the reactor is cooled to room temperature, vented to the atmosphere, the contents transferred to a still-pot and the cyclohexane removed by distillation. Final traces of the volatile materials are removed from the colorless, beeswax-like residue by heating on a steam bath under a pressure of approximately 10 to 20 mm. of mercury while admitting a small stream of nitrogen through a capillary tube. From six such runs, there is obtained 345 g. of the colorless beeswax-like ethylene/carbon monoxide copolymer which by analysis is found to contain ethylene and carbon monoxide in a molar ratio of 5.33:1 and to have a molecular weight of 1465.

These monoolefin/carbon monoxide polymers used in the practice of this invention can be described generically by the following type formula:

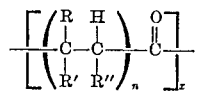

wherein $n$ is any number from 1 to 150 and preferably from 1.5 to 10 and R, R' and R'' may be hydrogen or lower alkyl radicals of 1 to 2 carbons provided further that the total number of carbons, if any contained in R, R' and R'' taken together cannot exceed 2, i. e., is less than 3, i. e., ranges from 0 to 2.

If desired, minor amounts of other polymerizable monomers can be included with the monoolefins and carbon monoxide in the polymerization charge necessary for their preparation. Examples of such other polymerizable monomers are vinyl compounds, e. g., vinyl chloride, vinyl acetate, styrene; vinylidene compounds, e. g., methylmethacrylate, ethylacrylate, vinylidene chloride; vinylene compounds, e. g., dimethylmaleate, maleic anhydride, etc.

The reaction conditions within which the invention can be practiced as well as the optimum conditions with regard to temperature, concentration, duration of reaction, etc., will vary depending on the particular polyketone being used and on the desired degree of conversion of carbonyl groups to alpha-hydroxyalkanephosphonic acid groups or their esters. In general, it is preferred to carry out the addition reaction at temperatures from 0 to 100° C. and preferably from 15 to 35° C. so as to minimize the undesirable formation of acetyl chloride from the phosphorus trichloride and the glacial acetic acid or acetic anhydride and under atmospheric pressure employing a reaction cycle of from 2 to 5 hours or longer. It is preferred to carry out the hydrolysis at temperatures from room temperature to 100° C. using a reaction cycle of from 15 minutes to 2 hours or longer.

A reaction solvent may or may not be used. Reaction solvents that can be used include those which are non-reactive with the polyketone or polyaldehyde, the phosphorus trichloride or chlorophosphate ester, the glacial acetic acid or acetic anhydride, as well as the end product polymeric hydroxyalkanephosphonic acid or ester. Such reaction media include for instance, in addition to excess glacial acetic acid or acetic anhydride, aromatic hydrocarbons, e. g., benzene; substituted aromatic hydrocarbons, e. g., chlorobenzene; aliphatic hydrocarbons, e. g., mixed hexanes; halogenated aliphatic hydrocarbons, e. g., chloroform, carbon tetrachloride, etc.

For every carbonyl group in the parent monoolefin/carbon monoxide polyketone it is desired to convert to an alpha-hydroxymethanephosphonic acid group, it is necessary to use one mole proportion of a trihalophosphine, e. g., phosphorus trichloride, and at least one, and preferably three or more, mole proportions of acetic anhydride or glacial acetic acid. Similarly, for each carbonyl group in the parent monoolefin/carbon monoxide polyketone it is desired to convert to an alpha-hydroxymethanephosphonic acid ester group, it is necessary to use one mole proportion of the requisite halophosphate ester and at least one, and preferably three or more, mole proportions of acetic anhydride or glacial acetic acid.

Similar products can be prepared from polymeric polyaldehydes, wherein the aldehyde groups are extralinear chain substituents, e. g., hydrolyzed ethylene/allylidene diacetate copolymers, by reacting the polyaldehyde with the same proportions of phosphorus trichloride or a halophosphate ester and glacial acetic acid or acetic anhydride. These phosphorous-containing products are characterized by having a plurality of extralinear alpha - hydroxymethanephosphonic acid or phosphonic acid ester groups.

The properties of the polyketones useable in the process of this invention can vary widely depending on the molecular weight or the proportion of the carbonyl groups in the chain or both. These factors can be easily varied by varying the monoolefin/carbon monoxide mole ratio and the polymerization conditions used in their preparation. The moloolefin/carbon monoxide polyketones that can be utilized in preparing the hydroxyalkanephosphonic acids and esters of this invention possess a monoolefin/carbon monoxide mole ratio of from 1:1 to 150:1 and have a molecular weight of from 250 to the maximum molecular weight, which is above 10,000 at which it is possible to obtain these polymers. It is preferred in making the hydroxyalkanephosphonic acids and esters of this invention to utilize monoolefin/carbon monoxide polyketones having a monoolefin/carbon monoxide mole ratio of 1.5:1 to 10:1 and a molecular weight of from 500 to 5000.

Variations in the molecular weight and in the proportion of carbonyl groups in the polyketones used to prepare the products of this invention lead to the production of an entire family of polymeric hydroxyalkanephosphonic acids and esters. Further, since it is possible through variations in the concentration, time, temperature and the other reaction variables to react from 1% or less to essentially all the carbonyl groups in the polyketone being used, this family of polymeric hydroxyalkanephosphonic acids and esters of this invention can vary markedly in molecular weight, proportion of combined carbonyl groups and proportion of hydroxyalkanephosphonic acid or ester groups. It is necessary that at least 1%, and preferably 4%, of the carbonyl groups of the parent polyketones be converted to hydroxyphosphonic acid or ester groups for the products to differ sufficiently from the initial polyketones to possess the desired properties.

The esters of the present polymeric alpha-hydroxyalkanephosphonic acids, as mentioned previously, may be prepared from the polymeric alpha-hydroxyalkanephosphonic acids involved. However, a more convenient method for preparing these polymeric alpha-hydroxyalkanephosphonic acid esters is that illustrated in Example V by the reaction of the polyketone involved with the desired diester of a halophosphoric acid, e. g., dipropylbromophosphate.

Although the higher and substituted esters of these polymeric alpha-hydroxyalkanephosphonic acids can be prepared by these methods, due to the greater availability of the intermediate halophosphate esters, the preferred esters are the dihydrocarbon esters of the polymeric alpha-hydroxyalkanephosphonic acids. Of these esters those in which the hydrocarbon ester groups contain no more than seven carbons each are particularly preferred. Specific examples of the diesters of halophosphoric acids that may be used in preparing the corresponding polymeric alpha-hydroxyalkanephosphonic acid esters of this invention include: dimethyl chlorothiophosphate, diethylchlorophosphate, diisopropyl chlorophosphate, dibutyl chlorophosphate, diphenyl chlorothiophosphate, dibenzyl chlorophosphate, di-(beta-chloroethyl) chlorophosphate, diphenyl fluorophosphate, dimethyl fluorophosphate.

The new polymeric alpha-hydroxyalkanephosphonic acids and their esters of this invention can be conveniently represented by the following generic formula:

$$\left[\left[\left(\begin{array}{cc}R & H \\ | & | \\ C-C \\ | & | \\ R^1 & R^2\end{array}\right)_n \begin{array}{c}OH \\ | \\ -C- \\ | \\ O=P(OR^3)_2\end{array}\right]_m \left[\left(\begin{array}{cc}R & H \\ | & | \\ C-C \\ | & | \\ R^1 & R^2\end{array}\right)_n \begin{array}{c}O \\ \| \\ -C- \end{array}\right]_{1-m}\right]$$

wherein R, $R^1$ and $R^2$ are hydrogen or lower alkyl radicals of 1 to 2 carbons and the total number of carbons, if any, contained in R, $R^1$ and $R^2$ taken together cannot exceed 2, i. e., is less than 3, i. e., ranges from 0 to 2; $R^3$ is hydrogen or an alkyl, aryl, or aralkyl radical, preferably hydrocarbon, of no more than seven carbons and the two $R^3$'s can be alike or different; $n$ is a number of from 1 to 150 and preferably from 1.5 to 10; $m$ is a number from 0.04 to 1.00. These polymers can vary in molecular weight from 250 to 10,000 or higher and preferably from 500 to 5,000 or higher. In the products of the illustrative examples, the groups having the subscript $n$ in the above formula are (—CH$_2$CH$_2$—) in Examples I, II and V

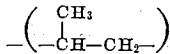

in Example III and variously (—CH$_2$CH$_2$—) and

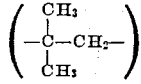

in Example IV; the OR$^3$ groups in Examples I, II, III and IV are —OH groups and in Example V are —OC$_2$H$_5$ groups.

The new, polymeric hydroxyphosphonic acids and their esters of this invention when prepared from polyketones of molecular weight from 1000 to 10,000 or higher and preferably 1000 to 5000 are film and fiber forming. They may be converted to films and fibers, for instance by melt pressing and melt spinning procedures. Such films and fibers exhibit considerable strength and do not support combustion making them useful in fields demanding good heat and flame resistance such as for instance, exhaust gaskets and the like.

The new, polymeric hydroxyphosphonic acids and their esters of this invention when prepared from polyketones of molecular weight from 250 to 1000 and preferably from 300 to 600, vary from mobile liquids to low melting solids and are in the main viscous liquids capable of incorporation with a wide variety of commercially available plastics. When incorporated with said plastics the resultant compositions are plasticized and at the same time made more flame resistant.

The new, polymeric alpha-hydroxyalkanephosphonic acids and their esters described herein that possess suitable solubility characteristics, i. e., solubility in neutral to mildly alkaline aqueous solutions, can be used as tanning agents.

As many apparently widely different embodiments of this invention may be made without departing from the spirit and scope thereof, it is to be understood that this invention is not limited to the specific embodiments thereof except as defined in the appended claims.

I claim:

1. A process for making polymers which comprises reacting at a temperature of from 0° C. to 200° C. a two to four carbon monoolefin/carbon monoxide polymer with a compound from the group consisting of phosphorus trichloride and dihydrocarbon halophosphate esters, and a second compound from the group consisting of glacial acetic acid and acetic anhydride, acid hydrolyzing the product obtained and isolating the resulting polymer, said monoolefin/carbon monoxide polymer having a molecular weight of at least 250 and a monoolefin/carbon monoxide mole ratio of from 1:1 to 150:1.

2. A process for making polymers which comprises reacting at a temperature of from 0° C. to 100° C. a two to four carbon monoolefin/carbon monoxide polymer with phosphorus trichloride and a substance selected from the group consisting of glacial acetic acid and acetic anhydride, acid hydrolyzing the product obtained, and isolating the resulting polymer, said monoolefin/carbon monoxide polymer having a molecular weight of at least 250 and a monoolefin/carbon monoxide mole ratio of from 1:1 to 150:1.

3. A process for making polymers which comprises reacting at a temperature of from 0° C. to 100° C. a two to four carbon monoolefin/carbon monoxide polymer with a dihydrocarbon halophosphate ester and a substance selected from the group consisting of glacial acetic acid and acetic anhydride, acid hydrolyzing the product obtained, and isolating the resulting polymer, said monoolefin/carbon monoxide polymer having a molecular weight of at least 250 and a monoolefin/carbon monoxide mole ratio of from 1:1 to 150:1.

4. Polymeric material consisting of a two to four carbon monoolefin/carbon monoxide polymer having a molecular weight of at least 250 and containing the monoolefin and carbon monoxide in a mole ratio of 1:1 to 150:1, and in which at least 1% of the carbonyl groups of said polymer are converted to groups from the class consisting of alpha-hydroxymethanephosphonic acid groups and alpha-hydroxymethanephosphonic acid ester groups.

5. Polymeric material as set forth in claim 4 wherein said monoolefin component of said polymer is ethylene.

6. Polymeric material consisting of a two to four carbon monoolefin/carbon monoxide polymer having a molecular weight of 500 to 5000 and containing the monoolefin and carbon monoxide in a mole ratio of 1.5:1 to 10:1, and in which at least 4% of the carbonyl groups of said polymer are converted to groups from the class consisting of alpha-hydroxymethanephosphonic acid groups and alpha-hydroxymethanephosphonic acid ester groups.

7. Polymeric material as set forth in claim 6 wherein said monoolefin component of said polymer is ethylene.

8. Polymeric material consisting of a two to four carbon monoolefin/carbon monoxide polymer having a molecular weight of at least 250 and containing the monoolefin and carbon monoxide in a mole ratio of 1:1 to 150:1, and in which at least 1% of the carbonyl groups of said polymer are converted to alpha-hydroxymethanephosphonic acid dihydrocarbon ester groups, said hydrocarbon ester portion of said groups each containing from 1 to 7 carbon atoms, inclusive.

9. Polymeric material consisting of a two to four carbon monoolefin/carbon monooxide polymer having a molecular weight of 500 to 5000 and containing the monoolefin and carbon monoxide in a mole ratio of 1.5:1 to 10:1, wherein at least 4% of the carbonyl groups of said polymer are converted to alpha-hydroxymethanephosphonic acid dihydrocarbon ester groups, said hydrocarbon ester portion of said groups each containing from 1 to 7 carbon atoms, inclusive.

ROBERT W. UPSON.

REFERENCES CITED

The following references are of record in the file of this patent:

UNITED STATES PATENTS

| Number | Name | Date |
|---|---|---|
| 2,491,920 | Ernsberger | Dec. 20, 1949 |
| 2,495,108 | Kosolapoff | Jan. 17, 1950 |